United States Patent [19]

Bourke et al.

[11] 4,268,906

[45] May 19, 1981

[54] DATA PROCESSOR INPUT/OUTPUT CONTROLLER

[75] Inventors: Donall G. Bourke; Richard N. Mendelson, both of Boca Raton; Luis Madruga, Delray Beach, all of Fla.

[73] Assignee: International Business Machines Corporation, Armonk, N.Y.

[21] Appl. No.: 972,381

[22] Filed: Dec. 22, 1978

[51] Int. Cl.³ .......................... G06F 3/00; G06F 9/46
[52] U.S. Cl. ................................................ 364/200
[58] Field of Search ... 364/200 MS File, 900 MS File

[56] References Cited

U.S. PATENT DOCUMENTS

| 3,447,135 | 5/1969 | Calta et al. | 364/200 |
|---|---|---|---|
| 3,665,415 | 5/1972 | Beard et al. | 364/200 |
| 3,905,025 | 9/1975 | Davis et al. | 364/200 |
| 4,027,290 | 5/1977 | Subrizi et al. | 364/200 |
| 4,038,642 | 7/1977 | Bonknecht et al. | 364/200 |
| 4,060,849 | 11/1977 | Bienvenu et al. | 364/200 |
| 4,079,448 | 3/1978 | N'Guyen et al. | 364/200 |
| 4,080,649 | 3/1978 | Calle et al. | 364/200 |
| 4,110,830 | 8/1978 | Krygowski | 364/200 |
| 4,115,854 | 9/1978 | Capowski et al. | 364/200 |
| 4,126,897 | 11/1978 | Capowski et al. | 364/200 |

Primary Examiner—Gareth D. Shaw
Assistant Examiner—Eddie P. Chan

[57] ABSTRACT

An I/O controller is provided for transferring data between a host processor and a plurality of I/O devices wherein the host processor generates a transfer command and each of the plurality of I/O devices generates multiple asynchronous service requests for transfer to the host processor. Control circuitry is provided for controlling the transfer of the service requests from the plurality of I/O devices to the host processor. The control circuitry generates a host processor interrupt signal for application to the host processor, such that in response to the host processor interrupt signal, the host processor generates the transfer command to allow the control circuitry to transfer the service requests to the host processor.

3 Claims, 3 Drawing Figures

DATA PROCESSOR INPUT/OUTPUT CONTROLLER

DESCRIPTION

Technical Field

This invention relates to computer systems, and more particularly to input/output (I/O) controllers for transferring data between a host processor and one or more peripheral input/output devices in digital data processing systems.

BACKGROUND ART

The control over transfer of data between a storage unit of a central processing unit and peripheral I/O devices over an input/output bus, or interface, can take many forms. Among the forms of input/output control for the purpose of data transfer are: direct program instruction control for each transfer of data, the initiation of data transfers by a central processor after which subsequent data transfer is accomplished under control of the peripheral device without use of the central processor, and logic for handling interrupt requests from peripheral devices to inform the central processor of peripheral device status. Included in several of these forms are control mechanisms for permitting peripheral I/O devices to initiate interrupt handling in the central processor by directly informing the processor of the device and status requiring handling. The interrupt request may require the central processor to initiate a polling signal to all attached devices, in series, to subsequently permit information to be transferred to the central processor identifying the device and status causing the interrupt. Such a polling technique is described in U.S. Pat. No. 4,038,642 issued to Bouknecht et al on July 26, 1977 and entitled "Input/Output Interface Logic for Concurrent Operations."

Previously existing I/O controllers, such as the controller described in the Bouknecht et al Patent are intended for use with a single I/O device. Such a controller only recognizes a single device address. Additional previously existing I/O controllers are used with multiple I/O devices, in which case, an address compare circuit is necessary to recognize the multiple device addresses. The recognition of multiple device addresses is necessary since there are different device addresses for each of the different I/O devices connected to the controller. In these prior art systems, the receipt of a proper device address is applied to the controller and also indicates to the controller which particular I/O device is being addressed.

Previously developed prior art controllers are not primarily useful for multiple I/O devices which have a single device address. Two problems are particularly associated with the use of an I/O control unit which recognizes or responds to a single I/O control unit address where the control unit has multiple I/O devices connected thereto. The nature of the first problem is that requests for service from the I/O devices are asynchronous in nature, such as operator requests from terminals, and may result in excessive interrupts to the processor, thereby reducing responsiveness to service requests during periods of high interrupt activity. A second problem is that requests for service from I/O devices can tie up the control unit to create a busy, interrupt pending, status and thereby prevent operations in response to service requests for those I/O devices which have already had their requests accepted by the processor.

A need has thus arisen for an I/O controller to pace the presenting of interrupts from asynchronous multiple I/O devices to a host processor and to reduce such interrupts during periods of high input/output device request activity. A need has further arisen for an I/O controller which increases control unit availability to a host processor I/O program and therefore, I/O device availability, by preventing I/O controller busy, interrupt pending, reporting to the host processor I/O command in high activity situations where the control unit would normally be attempting to field many interrupts into the host processor.

SUMMARY OF THE INVENTION

In accordance with the present invention, an I/O controller is provided for transferring data between a host processor and a plurality of I/O devices, wherein the host processor generates a transfer command and each of the plurality of I/O devices generate multiple asynchronous service requests for transfer to the host processor. The controller controls the transfer of the service requests from the plurality of I/O devices to the host processor. The controller generates a host processor interrupt signal for application to the host processor, such that in response to the host processor interrupt signal, the host processor generates the transfer command to allow the controller to transfer the service requests to the host processor while also allowing data to be transferred between the host processor and the plurality of I/O devices.

In accordance with another aspect of the present invention, an input/output controller is provided for transferring data between a host processor and a plurality of input/output devices, wherein the host processor generates a transfer command and each of the input/output devices generate multiple asynchronous service requests for transfer to the host processor. The input/output controller includes a processor interconnected to the input/output devices for receiving the service requests and for generating an interrupt request signal. The processor is responsive to the transfer command from the host processor for generating logic control signals. Circuitry is interconnected to the processor for storing pending service requests. Logic circuitry is provided and is activated in response to the interrupt request signal and the logic control signals to generate a host processor interrupt request signal to cause the host processor to generate the transfer command to thereby transfer the service requests to the host processor. The logic circuitry is deactivated by the transfer command to prevent generation of the host processor interrupt request signal when service requests are active or pending in the storage circuitry.

BRIEF DESCRIPTION OF THE DRAWINGS

For a more detailed description of the present invention and for further objects and advantages thereof, reference is made to the following Description, taken in conjunction with the accompanying Drawings in which.

DESCRIPTION OF THE PREFERRED EMBODIMENT

Figure 1:
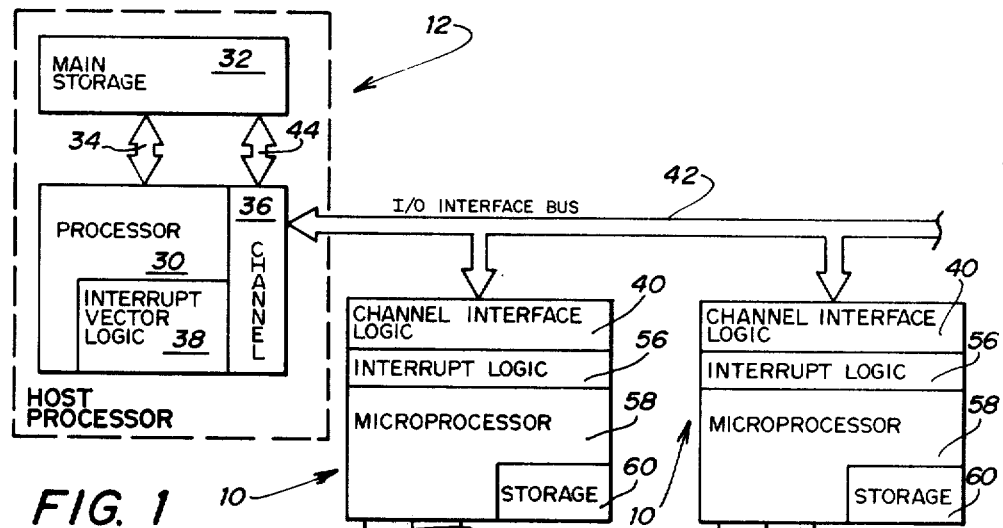
FIG. 1 is a schematic block diagram of a digital data processing system incorporating the I/O controller of the present invention.

Referring to FIG. 1, the present I/O controller is generally identified by the numeral 10. I/O controller 10 controls the transfer of data and other information between a host processor generally identified by the numeral 12 and a plurality of input/output (I/O) devices each identified by the numeral 14. Although only three I/O devices 14 are shown in FIG. 1, it will be understood that additional I/O devices 14 may be utilized with the present I/O controller 10 depending upon the configuration of the overall system. The overall system may also include additional I/O controllers 10 as shown in FIG. 1 interconnected to I/O devices 14. Characteristic of I/O devices 14 is that they are capable of generating multiple asynchronous service requests to host processor 12.

Host processor 12 includes a processor 30 and a main storage unit 32 for storage of data, machine instructions and input/output control information. Main storage unit 32 communicates with processor 30 via a bidirectional bus 34. Incorporated within processor 30 is an I/O channel subsystem 36. Processor 30 further includes interrupt vector logic 38 which may comprise an interrupt vector mechanism well known to those skilled in the art that utilizes a controller address to vector to the interrupt service portion of the input/output program contained within host processor 12.

I/O channel 36 communicates with channel interface logic 40 contained within I/O controller 10 via an I/O interface bus 42. Channel 36 communicates with main storage unit 32 via a bidirectional bus 44. I/O controller 10 communicates with I/O devices 14 via signal lines 50. Host processor 12 may comprise for example, a Series/1, Model 5 computer manufactured and sold by International Business Machines Corporation of Armonk, New York and which is described in the following references:

IBM Manual entitled "Series/1, Model 5, 4955 Processor Description," IBM Order No. GA34-0021 (1st Edition dated November, 1976);

IBM Manual entitled "Series/1, 4955 Processor Theory," IBM Order No. SY34-0041 (1st Edition dated January, 1977); and U.S. Pat. No. 4,038,642, entitled "Input/Output Interface Logic for Concurrent Operations," granted to Bouknecht et al on July 26, 1977 and assigned to International Business Machines Corporation of Armonk, New York.

The above-cited publications may be obtained through any IBM branch office throughout the world. The descriptions set forth in these publications and U.S. Pat. No. 4,038,642 are incorporated herein by reference. These references give detailed descriptions of the construction and operation of host processor 12, channel 36 and I/O interface 42.

I/O controller 10 includes channel interface logic 40 for interfacing to I/O interface bus 42. Also included within I/O controller 10 is interrupt logic circuit 56 as will be subsequently described with reference to FIGS. 2 and 3. A microprocessor 58 and storage 60 is also provided within I/O controller 10. Microprocessor 58 may comprise, for example, a microprocessor of the type described in connection with FIG. 17 of U.S. Pat. No. 4,038,642 to Bouknecht et al referred to above.

Figure 2:
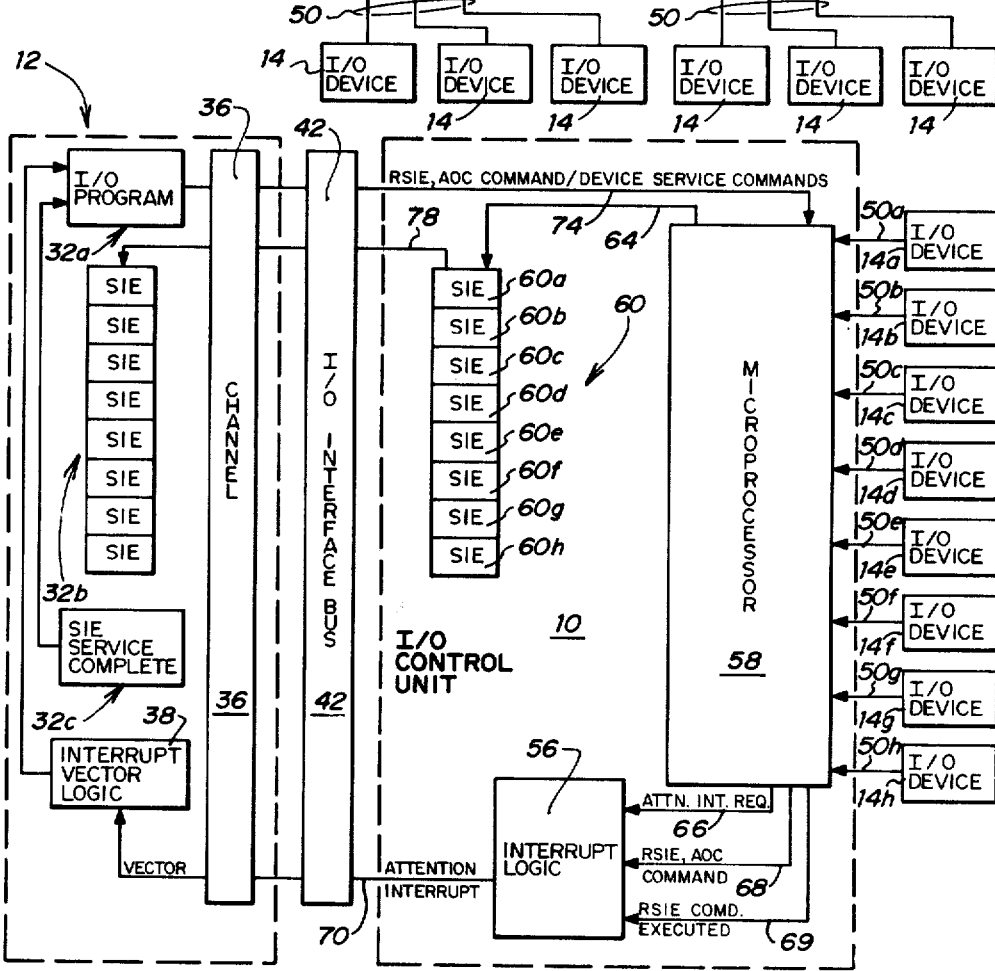
FIG. 2 is a schematic block diagram illustrating in greater detail the I/O controller of the present invention.

Referring to FIG. 2, a more detailed block diagram of the present I/O controller 10 and host processor 12 is illustrated wherein like numerals are utilized for like and corresponding components previously identified. I/O devices 14a-14h apply via signal lines 50a-50h data including asynchronous service requests to microprocessor 58. Micro-processor 58 applies via a signal line 64 the I/O device 14 service requests to storage 60 which may comprise a register stack of device or station interrupt elements (SIE) arranged in an SIE queue. The SIE for any given I/O device 14 or station includes the device address, request identifier code and device status pertinent to the interrupt request. The device address is not a control unit address, but is more in the nature of a sub-address which is used within I/O controller 10 for purposes of identifying the particular I/O device 14.

Microprocessor 58 applies via a signal line 66 the attention interrupt request signal and via signal line 68 the read station interrupt element, arm on condition (RSIE, AOC) command signal to interrupt logic 56. Microprocessor 58 further generates the RSIE command executed signal via signal line 69. The function of this signal will be subsequently explained. Interrupt logic 56 generates the attention interrupt signal applied via signal line 70 to I/O interface bus 42 for application to interrupt vector logic 38 via channel 36. Interrupt vector logic 38 is utilized in connection with the I/O program 32a of main storage 32.

I/O program 32a generates the RSIE, AOC command and device service commands which are applied to microprocessor 58 via data bus 74 through channel 36 and I/O interface bus 42. An important aspect of the present invention is the RSIE, AOC command which functions to arm or disarm interrupt logic 56 depending upon whether service requests generated by I/O devices 14a-14h are active or pending within SIE storage 60.

The operation of the present I/O controller 10 in connection with host processor 12 will now be described with reference to FIG. 2. For purposes of discussion, it will be assumed that initially the interrupt logic 56 is activated or armed. In the armed state if one of I/O devices 14a-14h provides a service request to microprocessor 58, interrupt logic 56 will apply the attention interrupt signal to interrupt vector logic 38 for host processor vectoring to I/O program 32a. The attention interrupt signal is an asynchronous interrupt to host processor 12. Any one of I/O devices 14a-14h may send a service request to microprocessor 58 within I/O controller 10.

Upon receipt of such a service request via signal lines 50a-50h, such as line 50a from I/O device 14a, microprocessor 58 builds an SIE element, 60a-60h, for the given I/O device 14a-14h requesting service within SIE storage 60. Microprocessor 58 then generates the attention interrupt request signal via signal line 66 to interrupt logic 56 which at this time is in the armed state. Interrupt logic 56 then generates the attention interrupt signal for application to host processor 12.

Host processor 12 subsequently recognizes the attention interrupt signal and host processor I/O program 32a generates the RSIE, AOC command to I/O controller 10 for application to microprocessor 58 via data bus 74. The RSIE, AOC command arms interrupt logic 56 on condition that there are no active SIE elements 60a-60h pending in SIE storage 60. RSIE, AOC command deactivates or disarms interrupt logic 56 if any active SIE elements 60b-60h are pending in SIE storage 60. Therefore, it can be seen that the RSIE, AOC command will disarm interrupt logic 56 since SIE element 60a for I/O device 14a requesting service is pending in SIE storage 60. As a result of the RSIE, AOC command, the active SIE data is transferred to an SIE storage 32b within host processor 12 main storage 32 via data bus 78 through I/O interface bus 42 and channel 36. On successful execution of the RSIE, AOC command, microprocessor 58 signals interrupt logic 56 via signal line 69 that there are no SIE elements pending in SIE storage 60. I/O program 32a services the pending SIE in SIE storage 32b.

When a second I/O device, such as I/O device 14b, sends a service request to microprocessor 58, microprocessor 58 proceeds to build and store within SIE storage 60 an SIE element 60b for I/O device 14b. Microprocessor 58 then generates an attention interrupt request signal via signal line 66 which is applied to interrupt logic 56. However, since interrupt logic 56 is disarmed due to the previous application of the RSIE, AOC command to microprocessor 58, no attention interrupt signal is generated by interrupt logic 56 for application to host processor 12. An important aspect of the present invention is that in the disarmed state of interrupt logic 56, any service commands to I/O controller 10 from host processor 12 to respond to I/O device 14a are not blocked because I/O controller 10 is not in an interrupt pending state.

It is assumed further that a third I/O device 14c then sends a service request to microprocessor 58. Microprocessor 58 proceeds to build and store an SIE element 60c for I/O device 14c. Microprocessor 58 generates the attention interrupt request signal to interrupt logic 56, but as in the prior service request from I/O device 14b, interrupt logic 56 does not generate the attention interrupt signal. When the host processor I/O program 32a completes the servicing of the SIE from I/O device 14a in host processor SIE storage 32b as controlled by SIE service complete program 32c, I/O program 32a generates a new RSIE, AOC command to I/O controller 10. I/O controller 10 is not busy as no interrupt is pending and therefore can respond to the RSIE command.

Since SIE elements 60b and 60c are pending in SIE storage 60, interrupt logic 56 is maintained in the disarmed state. As a result of the second RSIE, AOC command from host processor 12 the data in SIE elements 60b and 60c for I/O devices 14b and 14c are transferred to the host processor 12 SIE storage 32b. On successful execution of the RSIE, AOC command, microprocessor 58 signals interrupt logic 56 via signal line 69 that there are no SIE elements pending in SIE storage 60. I/O program 32a then services the SIE elements for I/O devices 14b and 14c. The event representing completion of the SIE service is signaled by SIE service complete 32c which causes I/O program 32a to issue a third RSIE, AOC command to I/O controller 10. Because now there are no active or pending SIE elements in SIE storage 60 of I/O controller 10, microprocessor 58 rearms interrupt logic 56. Interrupt logic 56 is now in a state to interrupt drive host processor 12 and the next I/O device 14 requesting service will cause a new attention interrupt signal to be generated by interrupt logic 56 for application to host processor 12.

It therefore can be seen that the use of the present I/O controller 10 eliminated two host processor 12 attention interrupts in the above described operation wherein three I/O devices 14a-14c requested service. The RSIE, AOC command allows host processor 12 to pace the interrupt from I/O device 14 and to reduce the interrupt frequency during periods of high device activity. Availability of the I/O devices to the I/O program 32a to service their requests is therefore maintained. Further, host processor I/O program 32a maintains interrupt or event driven characteristics. Thus, I/O program 32a does not have to be designed for non-interrupt or non-event driven polling for device service requests, which are wasteful of host processor 12 instruction cycles.

Figure 3:
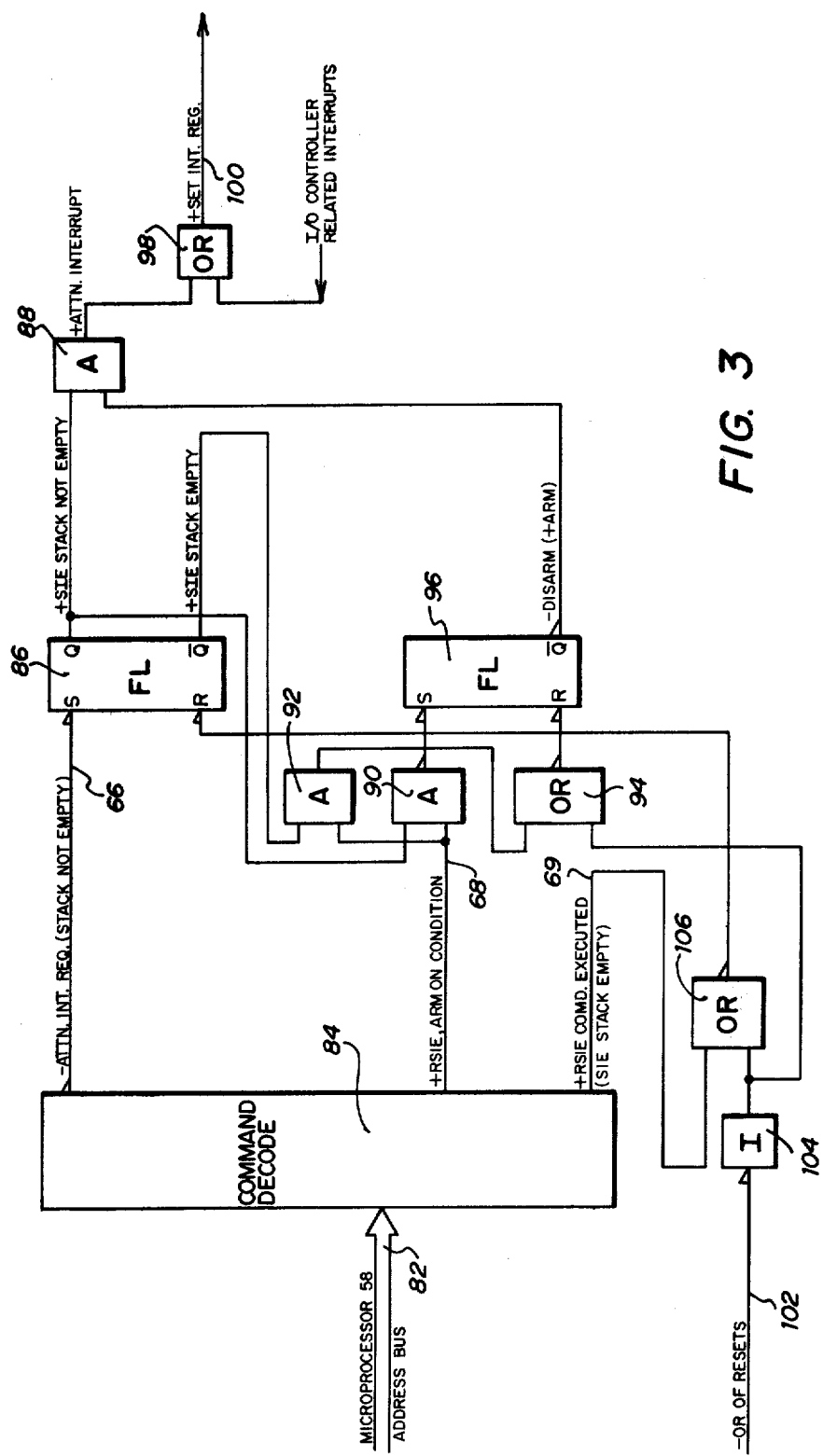
FIG. 3 is a schematic logic diagram illustrating the interrupt logic of the present I/O controller.

FIG. 3 illustrates a schematic logic diagram of interrupt logic 56 and is explained in connection with FIGS. 18 and 19 of the Bouknecht et al U.S. Pat. No. 4,038,642. Microprocessor 58 address bus 82 is applied to command decode 84. Microprocessor 58 address bus 82 corresponds to the microprocessor address bus 127 of FIG. 18 of the Bouknecht et al Patent. After microprocessor 58 has completed building an SIE element 60a-60b, command decode 84 generates the—attention interrupt request (SIE stack not empty) signal applied to a bistable device 86. An output of bistable device 86 representing the + SIE stack not empty signal is applied to AND circuits 88 and 90. An output of bistable device 86 representing the + SIE stack empty signal is applied to an AND circuit 92. AND circuit 90 also receives the + RSIE arm on condition command signal generated by command decode 84. The output of AND circuit 92 is applied to an OR circuit 94.

The output of AND circuit 90 and OR circuit 94 are applied to a bistable device 96 which generates the − disarm (+ arm) signal applied to AND circuit 88 to generate the + attention interrupt signal. If AND circuit 88 is not inhibited its output is applied to an OR circuit 98 which generates the + set interrupt request signal via signal line 100. Signal line 100 corresponds to signal line 176 of FIG. 19 of the Bouknecht et al U.S. Pat. No. 4,038,642. OR circuit 98 also receives inputs from interrupt signals related to operation of I/O controller 10, not the particular I/O devices 14.

The − OR of resets signal is applied via signal line 102 to an Inverter circuit 104. Signal line 102 corresponds to the − OR of resets signal applied to OR circuit 178 of FIG. 19 of the Bouknecht et al Patent. The output of Inverter circuit 104 is applied to an OR circuit 106 and to OR circuit 94. OR circuit 106 also receives the + RSIE command executed (SIE stack empty) signal from command decode 84 and generates an output to bistable device 86. The − OR of resets signal functions as a master reset for bistable device 86 and applied through OR circuit 106 resets bistable device 96. Therefore in the initial state bistable devices 86 and 96 are reset to the SIE stack empty and armed states, respectively.

It therefore can be seen that the present invention provides for a I/O controller for pacing the presentation of service request interrupts from asynchronous multiple I/O devices to a host processor and to reduce such interrupts during periods of high I/O device request activity.

Whereas the present invention has been described with respect to specific embodiments thereof, it will be understood that various changes and modifications will be suggested to one skilled in the art, and it is intended to encompass such changes and modifications that fall within the scope of the appended claims.

We claim:

1. An input/output controller for transferring service request signals and data between a plurality of input- /output devices and a host processor, wherein each of the plurality of input/output devices generate multiple asynchronous service request signals for transfer to the host processor comprising:

processor means interconnected via a plurality of signal lines to the plurality of input/output devices for receiving data and the service request signals generated by the plurality of input/output devices via said plurality of signal lines, said processor means operable to generate a first signal in response to receipt of a service request signal from one of the plurality of input/output devices;

storage means interconnected to said processor means for storing service request signals received by said processor means from the plurality of input/output devices;

said processor means operable to generate a second signal upon the condition that no service request signals are stored in said storage means;

logic means operable between active and deactive states, being interconnected to said processor means and being operable to receive said first and second signals generated by said processor means;

said logic means further being connected to the host processor and being operable in said active state in response to receipt of said first and second signals generated by said processor means to thereby generate a third signal for application to the host processor upon the condition that no service request signals are stored in said storage means while said logic means is in said deactive state to thereby transfer from said storage means to the host processor those service request signals generated by the plurality of input/output devices and stored in said storage means while said logic means is in said active state;

the host processor being operable to generate a fourth signal upon receipt of said third signal from said logic means, said fourth signal being applied to said processor means via a bus, said processor means operable to generate a fifth signal upon receipt of said fourth signal from the host processor for application to said logic means;

said logic means being operable in said deactive state upon receipt of said fifth signal from said processor means to thereby prevent generation of additional ones of said third signal from said logic means for application to the host processor until processing of the service request signals transferred from said storage means to the host processor has been completed by the host processor, generation of said third signal being prevented while service requests are stored in said storage means to allow data to be transferred from the host processor via said bus to the ones of the plurality of input/output devices associated with the service request signals transferred to the host processor while the other ones of said plurality of input/output devices generate additional service request signals to said processor means for storage in said storage means; and said logic means being reactivated in said active state upon receipt of said second and fifth signals from said processor means.

2. The input/output controller of claim 1 wherein said processor means comprises microprocessing means.

3. The input/output controller of claim 1 wherein said storage means comprises register means.

* * * * *

UNITED STATES PATENT AND TRADEMARK OFFICE
CERTIFICATE OF CORRECTION

PATENT NO. : 4,268,906
DATED : May 19, 1981
INVENTOR(S) : Donall G. Bourke, Richard N. Mendelson and Luis Madruga It is certified that error appears in the above—identified patent and that said Letters Patent is hereby corrected as shown below:

Column 4, line 68, change "60b" to --60a--;
Column 6, line 1, change "device 14" to --devices 14--.

Signed and Sealed this

Fourth Day of August 1981

[SEAL]

Attest:

*Attesting Officer*

GERALD J. MOSSINGHOFF
*Commissioner of Patents and Trademarks*